(12) United States Patent
Chen et al.

(10) Patent No.: US 10,971,321 B2
(45) Date of Patent: Apr. 6, 2021

(54) PROTECTION DEVICE AND BATTERY PACK

(71) Applicant: Pao-Hsuan Chen, Taoyuan (TW)

(72) Inventors: Pao-Hsuan Chen, Taoyuan (TW); Sha-Li Chen, Taoyuan (TW)

(73) Assignee: Pao-Hsuan Chen, Taoyuan (TW)

( * ) Notice: Subject to any disclaimer, the term of this patent is extended or adjusted under 35 U.S.C. 154(b) by 618 days.

(21) Appl. No.: 15/942,579

(22) Filed: Apr. 2, 2018

(65) Prior Publication Data

US 2018/0294124 A1    Oct. 11, 2018

(30) Foreign Application Priority Data

Apr. 6, 2017  (TW) .................................. 106111508
May 8, 2017  (TW) .................................. 106115105

(51) Int. Cl.

| | |
|---|---|
| *H02J 7/14* | (2006.01) |
| *H01H 85/00* | (2006.01) |
| *H01M 10/44* | (2006.01) |
| *H01M 10/615* | (2014.01) |
| *H01M 10/42* | (2006.01) |
| *H01M 50/20* | (2021.01) |
| *H01M 50/581* | (2021.01) |
| *H01H 85/46* | (2006.01) |
| *H01H 85/143* | (2006.01) |
| *H01H 85/43* | (2006.01) |

(52) U.S. Cl.

CPC .... *H01H 85/0056* (2013.01); *H01H 85/0047* (2013.01); *H01M 10/425* (2013.01); *H01M 10/443* (2013.01); *H01M 10/615* (2015.04); *H01M 50/20* (2021.01); *H01M 50/581* (2021.01); *H01H 85/0082* (2013.01); *H01H 85/143* (2013.01); *H01H 85/43* (2013.01); *H01H 2085/466* (2013.01); *H01M 2200/103* (2013.01)

(58) Field of Classification Search
None
See application file for complete search history.

(56) References Cited

U.S. PATENT DOCUMENTS

| | | | |
|---|---|---|---|
| 2003/0027036 A1* | 2/2003 | Emori ................. | H01M 50/581 429/61 |
| 2003/0152830 A1* | 8/2003 | Eaves ................. | H01M 10/425 429/156 |

(Continued)

FOREIGN PATENT DOCUMENTS

TW          201545195         12/2015

*Primary Examiner* — Arun C Williams
(74) *Attorney, Agent, or Firm* — JCIPRNET

(57) ABSTRACT

A protection device and a battery pack are provided, the protection device includes multiple terminal electrodes including a first terminal electrode and a second terminal electrode; a fusible conductor, where a lower surface of the fusible conductor is disposed on the first and second terminal electrodes, and the fusible conductor is supported by the first and second terminal electrodes, and two ends of the fusible conductor are electrically connected to the first and second terminal electrodes, respectively; and a first heat generating element, where one end of the first heat generating element is coupled to another surface of the fusible conductor different to the lower surface, or one end of the first heat generating element is coupled to a surface of any one of the first and second terminal electrodes.

20 Claims, 15 Drawing Sheets

(56) References Cited

U.S. PATENT DOCUMENTS

| | | | |
|---|---|---|---|
| 2005/0073282 A1* | 4/2005 | Carrier | B25F 5/00 320/106 |
| 2005/0221164 A1* | 10/2005 | Kawazu | H01M 10/425 429/61 |
| 2006/0076923 A1* | 4/2006 | Eaves | G01T 1/249 320/112 |
| 2006/0078787 A1* | 4/2006 | Sato | H01M 50/581 429/62 |

* cited by examiner

PROTECTION DEVICE AND BATTERY PACK

CROSS-REFERENCE TO RELATED APPLICATION

This application claims the priority benefits of Taiwan application serial no. 106111508, filed on Apr. 6, 2017, and Taiwan application serial no. 106115105, filed on May 8, 2017. The entirety of each of the above-mentioned patent applications is hereby incorporated by reference herein and made a part of this specification.

BACKGROUND OF THE INVENTION

Field of the Invention

The invention relates to a protection device and a battery pack, and particularly relates to a protection device with an over-current, over-voltage or over-temperature protection function and adapted to withstand a high charge or discharge current and a battery pack using the same.

Description of Related Art

In a conventional protection device used in a battery pack, a fusible conductor thereof is generally disposed above a substrate and a terminal electrode, and the fusible conductor is coupled to the terminal electrode. A transient working current applied to a motor-related circuit in the future is rather high, which is even higher than 50 A, and both of the terminal electrode disposed on the substrate and the substrate cannot withstand such large abnormal current, even more, the terminal electrode and the substrate may be melted or broken due to a high heat and high pressure produced when the fusible conductor is fused. Moreover, if the fusible conductor may withstand the working current or a rated current between 30 A and 100 A, a cross-sectional area (a thickness and a width) thereof has to be enlarged, and when the fusible conductor is fused and separated into two parts, a distance between the two parts has to be large enough, so as to ensure that an insulating resistance of the fused fusible conductor is within a safety range. In other words, the substrate and the terminal electrode are preferably not configured below the fusible conductor and located in a same plane, so as to avoid a problem that the spattered fusible conductor results in a low insulating resistance of the fused fusible conductor.

Prior technical literature: Intellectual Property Bureau of Taiwan patent publication No. 201545195.

SUMMARY OF THE INVENTION

Problems to be Resolved by the Invention

In the protection device of the prior art, a first electrode, a second electrode and an insulating substrate are almost disposed below or at a lower surface of a fusible conductor, and the insulating substrate is disposed between the first electrode and the second electrode, such that the first electrode, the second electrode and the insulating substrate are almost in a same plane. As there is no large height difference between these electrodes (i.e. the first electrode and the second electrode) and the insulating substrate, and the fusible conductor is disposed above the first electrode, the second electrode and the insulating substrate, at the moment when the fusible conductor is fused, the spattered fused fusible conductor probably falls on the insulating substrate, such that an insulating resistance between the first electrode and the second electrode probably cannot reach a requirement of a high resistance or a high resistor or a requirement of an open circuit after the fusible conductor is fused.

In order to resolved the above problem, the invention provides a protection device and a battery pack, the protection device includes a plurality of terminal electrodes including a first terminal electrode and a second terminal electrode; a fusible conductor, where a lower surface of the fusible conductor is respectively disposed on the first terminal electrode and the second terminal electrode, and the fusible conductor is supported by the first terminal electrode and the second terminal electrode, and two ends of the fusible conductor are electrically connected to the first terminal electrode and the second terminal electrode, respectively, so as to form a two-way current path between the first terminal electrode and the second terminal electrode; and a first heat generating element, where one end of the first heat generating element is coupled to another surface of the fusible conductor different to the lower surface of the fusible conductor, or one end of the first heat generating element is coupled to a surface of any one of the first terminal electrode and the second terminal electrode.

The invention provides a protection device including a plurality of terminal electrodes including a first terminal electrode and a second terminal electrode; a fusible conductor, where two ends of the fusible conductor are electrically connected to the first terminal electrode and the second terminal electrode, respectively; and a first heat generating element, including two heater electrodes and a first heater, and the two heater electrodes and the first heater construct a sandwich structure, and one end of the first heat generating element is coupled to the fusible conductor.

The invention provides a battery pack including at least one battery element; the aforementioned protection device, where the protection device and is connected in series with the at least one battery element to form at least one charge or discharge current path, and has an ability to disconnect the charge or discharge current path; a switching circuit, configured to control a current passing through the first heat generating element; and a detection control circuit, configured to detect a voltage or a temperature of the at least one battery element, and determine a state of the switching circuit according to the detected voltage or temperature.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
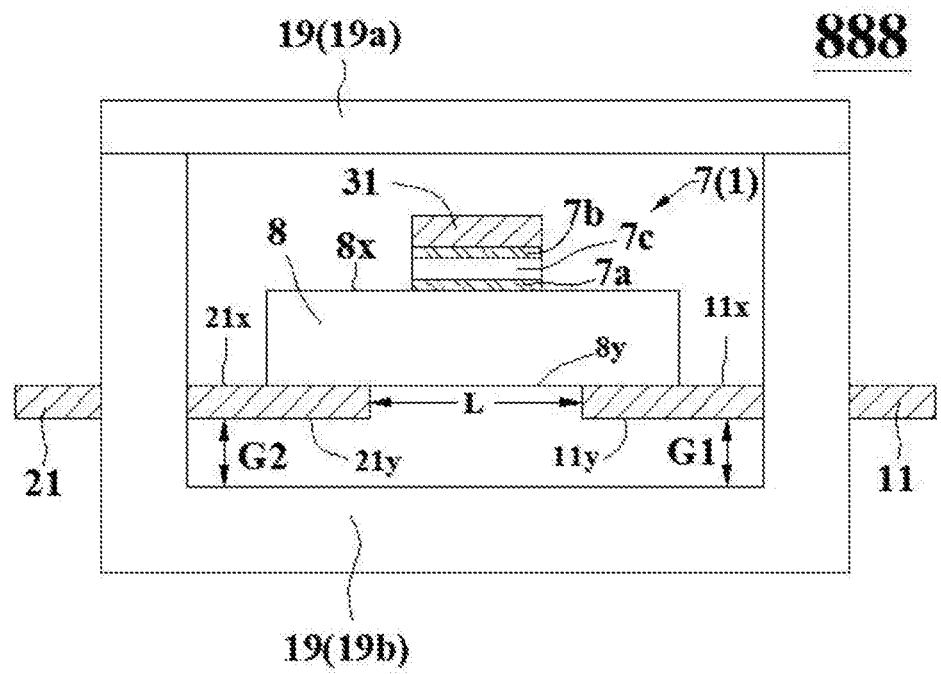
FIG. 1 is a cross-sectional view of a protection device 888 facing a left surface portion 19$x$1 of FIG. 1P.

Reference will now be made in detail to the present preferred embodiments of the invention, examples of which are illustrated in the accompanying drawings. Wherever possible, the same reference numbers are used in the drawings and the description to refer to the same or like parts. Moreover, the figures are illustrated in a schematic way, and some parts therein are not necessarily drawn to scale, which are determined according to following descriptions. Regarding the cross-sectional view of the figures, unless otherwise specified, the figures are all cross-sectional views facing a left surface portion 19x1 of FIG. 1P as that of FIG. 1, detailed implementations are as follows.

[Protection Device]

Figure 2:
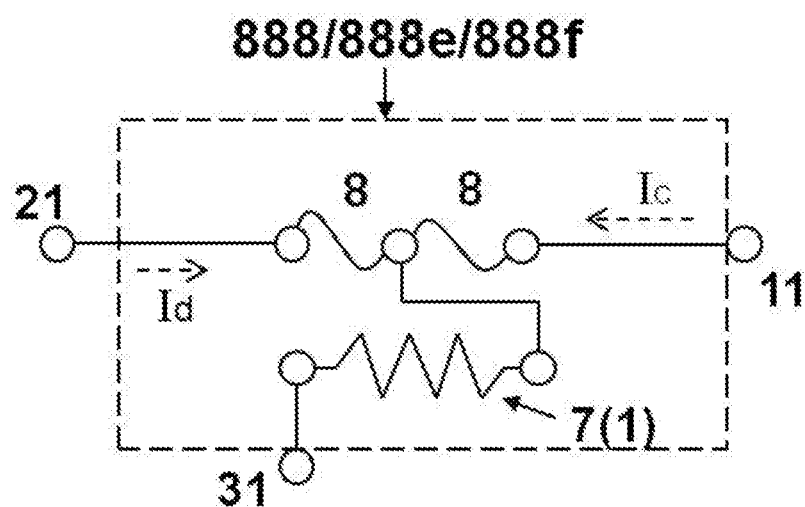
FIG. 2 is an equivalent circuit diagram of a protection device.

FIG. 1 is a cross-sectional view of a protection device 888 of one implementation of the invention. FIG. 2 is an equivalent circuit diagram of the protection device 888. Referring to FIG. 1 and FIG. 2, the protection device 888 of the embodiment includes an insulation casing 19, three terminal electrodes 11, 21, and 31, a fusible conductor 8 and a first heat generating element 7(1).

[The Insulation Casing 19]

The insulation casing 19 has an effect of protecting elements or objects located within the insulation casing 19, the insulation casing 19 may protect the fusible conductor 8, a second terminal of each of the terminal electrodes, and the first heat generating element 7(1). The insulation casing 19 includes an insulation casing cover 19a and an insulation casing base 19b. A component of the insulation casing 19 includes one of a polymer and a ceramic material or a combination thereof, where the ceramic material includes one of silicon carbide (SiC), aluminum oxide, aluminum nitride, silicon nitride ($Si_3N_4$), graphite, or a combination of two or more of the above materials. The polymer includes any type of an engineering plastic with good heat resistance, or a combination of two or more types of the engineering plastic. The main component of the insulation casing 19 of the protection device 888 is a polymer including polyhenylenesulfide. When the insulation casing 19 has a shape shown in FIG. 1 or FIG. 1P (or other shapes), the two portions (or more portions) of the insulation casing 19 including the insulation casing cover 19a and the insulation casing base 19b may be separately formed. An embedded forming process may be applied to the insulation casing base 19b to integrally form the first terminal electrode 11, the second terminal electrode 21, the third terminal electrode 31 and the insulation casing base 19b. The insulation casing 19 has six surface portions including a left surface portion 19x1, a right surface portion 19x2, a top surface portion 19x3, a bottom surface portion 19x4, a front surface portion 19x5 and a back surface portion 19x6 (shown in FIG. 1P).

[The Insulation Casing 19 has Openings or a Porous Ceramic Structure]

Figure 1A:
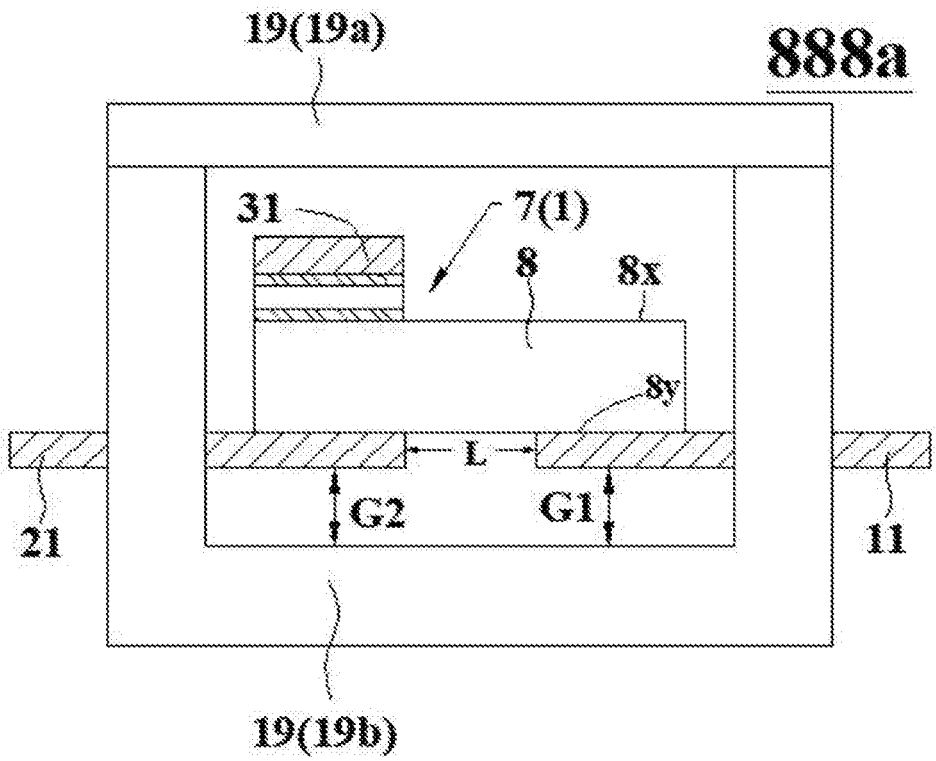
FIG. 1A is a cross-sectional view of a protection device 888$a$.
Figure 1B:
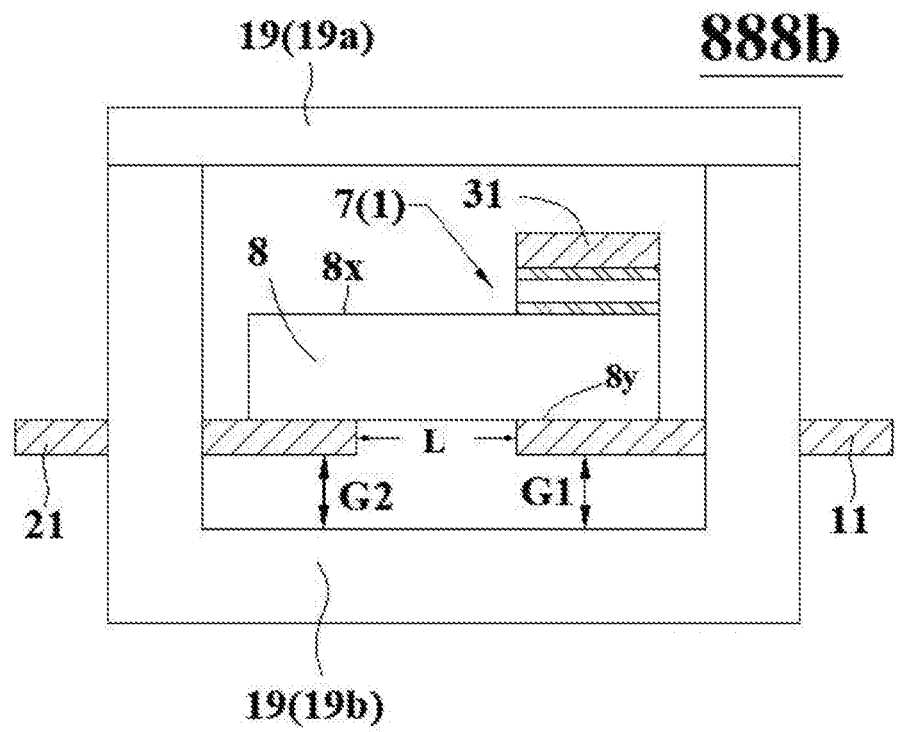
FIG. 1B is a cross-sectional view of a protection device 888$b$.
Figure 1C:
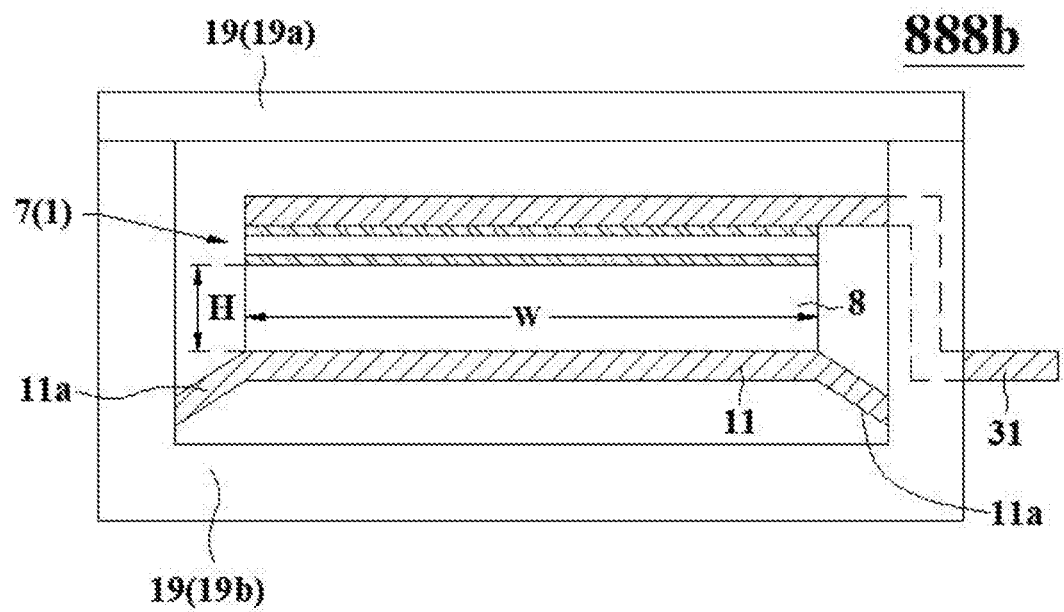
FIG. 1C is a cross-sectional view of the protection device 888 facing a front surface portion 19$x$5 of FIG. 1P.
Figure 1D:
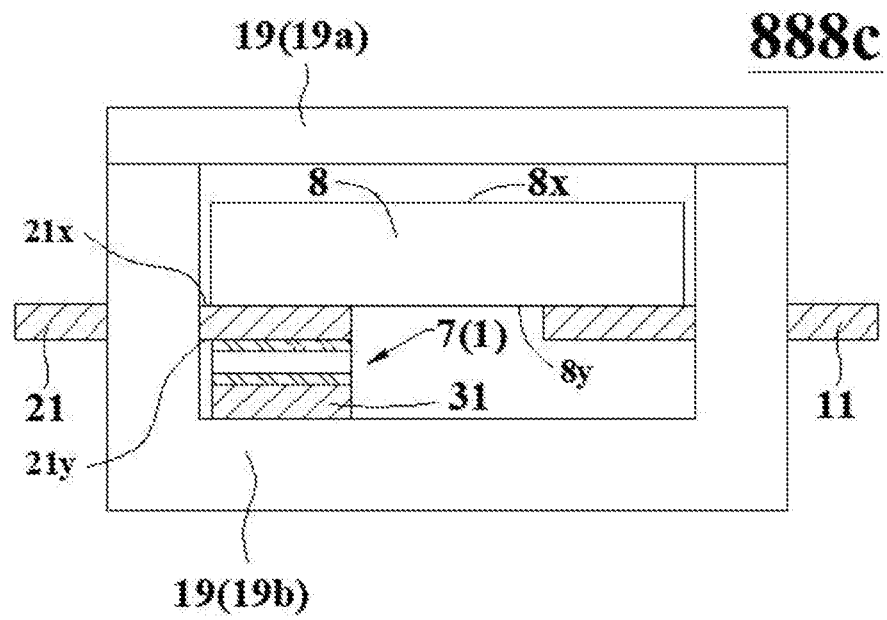
FIG. 1D is a cross-sectional view of a protection device 888c.
Figure 1E:
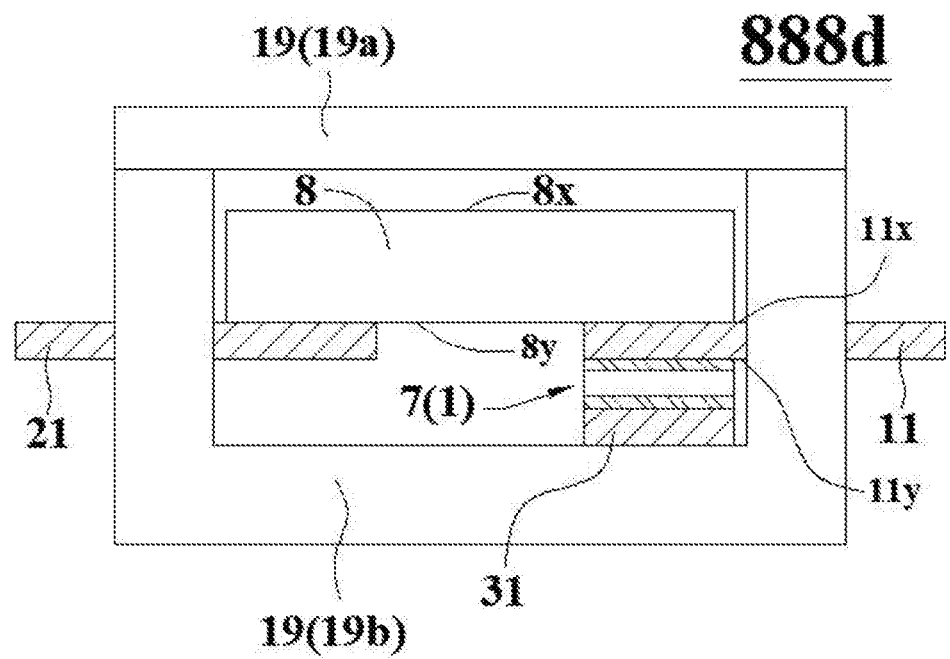
FIG. 1E is a cross-sectional view of a protection device 888d.
Figure 1F:
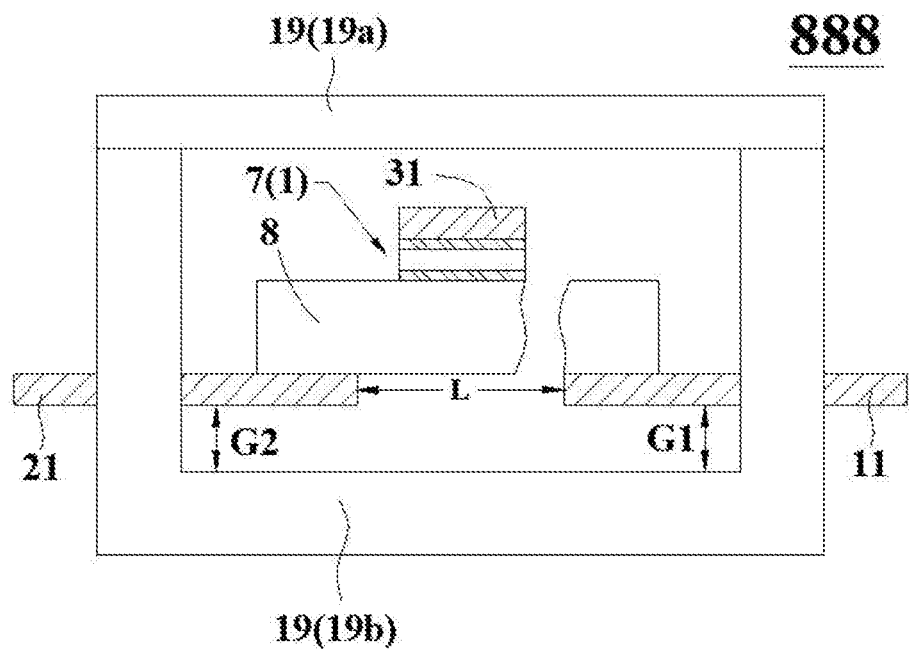
FIG. 1F is a cross-sectional view of the protection device 888 after a fusible conductor is fused.
Figure 1G:
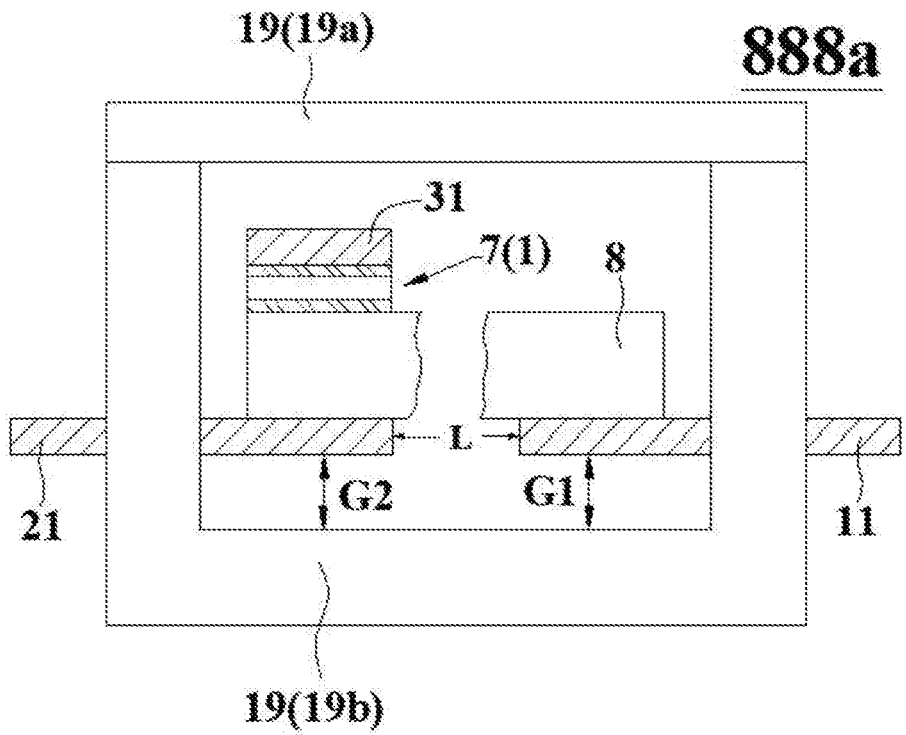
FIG. 1G is a cross-sectional view of the protection device 888a after the fusible conductor is fused.
Figure 1H:
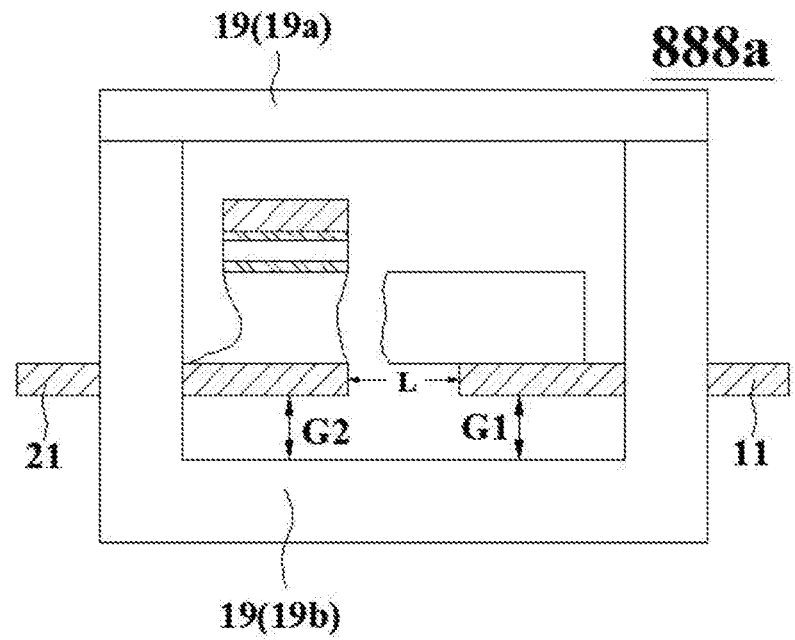
FIG. 1H is a cross-sectional view of the protection device 888a after the fusible conductor is fused.
Figure 1I:
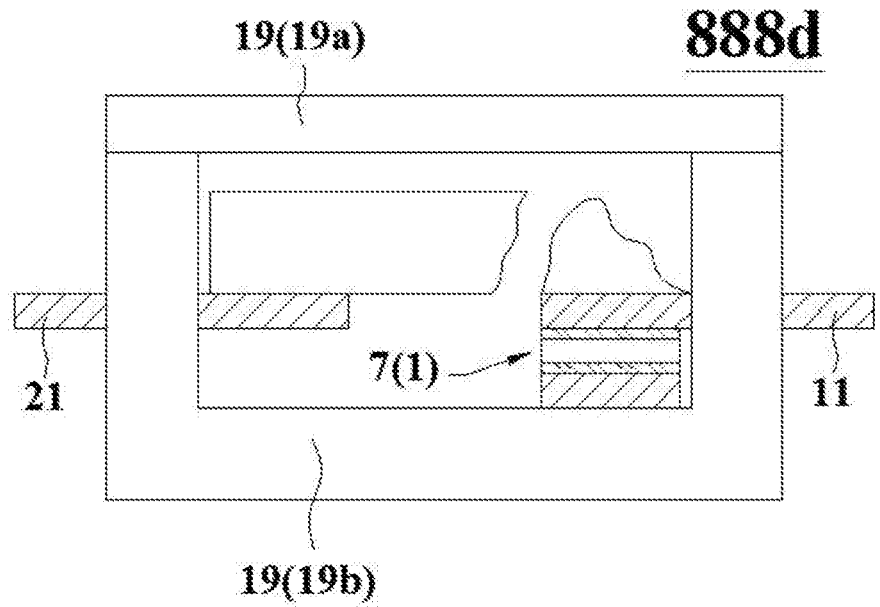
FIG. 1I is a cross-sectional view of the protection device 888d after the fusible conductor is fused.
Figure 1J:
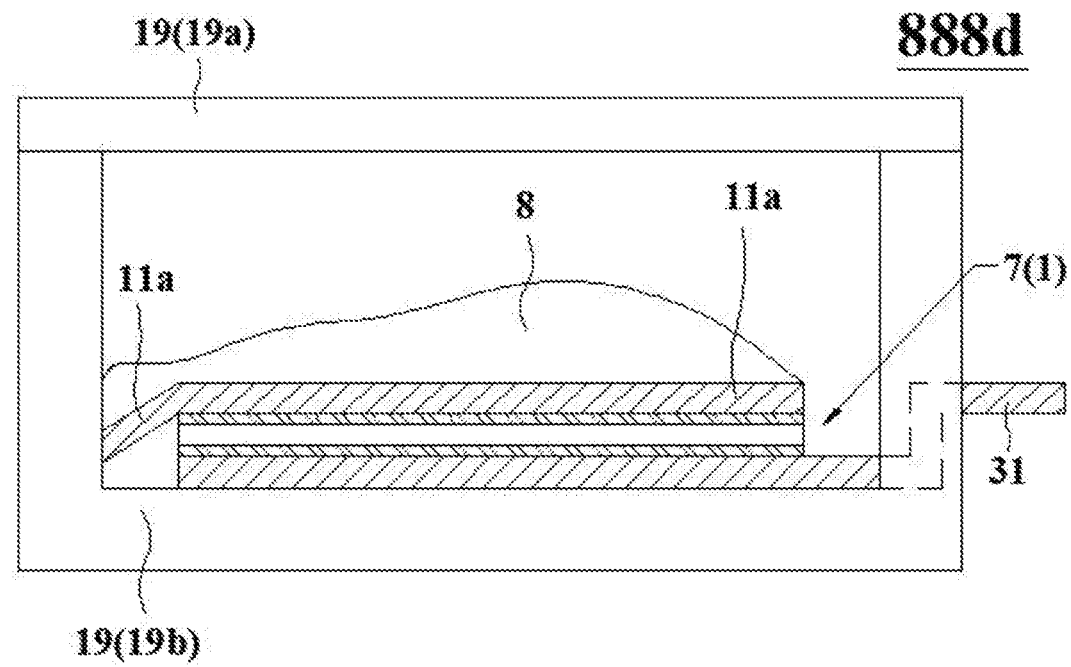
FIG. 1J is a cross-sectional view of the protection device 888d facing the front surface portion 19x5 of FIG. 1P.
Figure 1K:
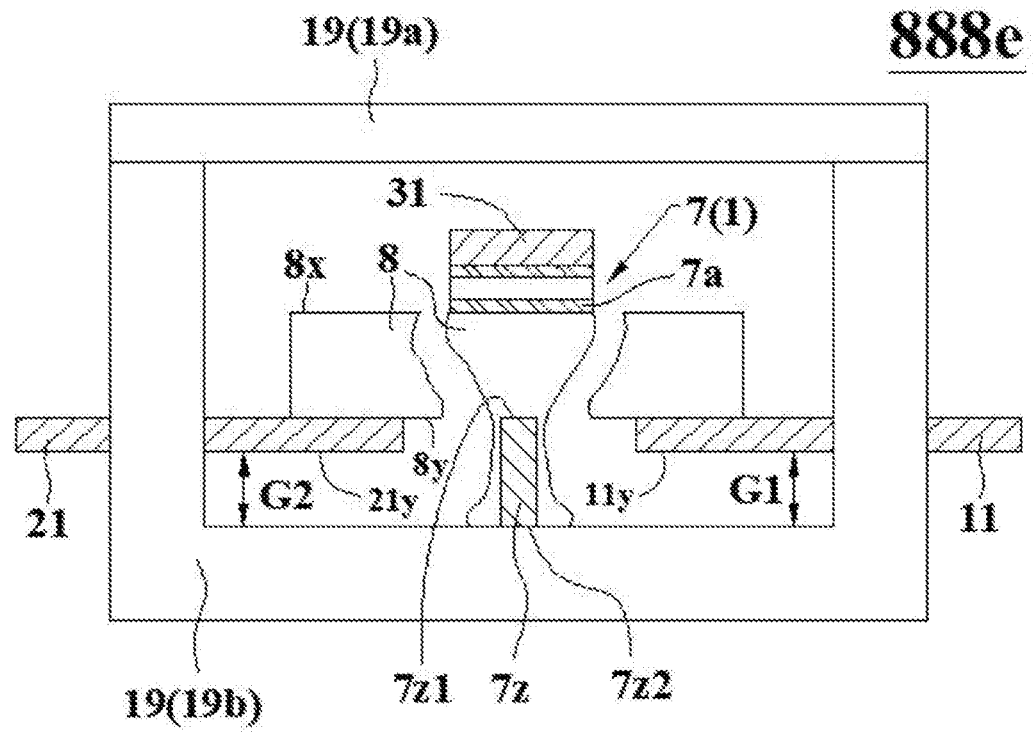
FIG. 1K is a cross-sectional view of a protection device 888e after the fusible conductor is fused.
Figure 1L:
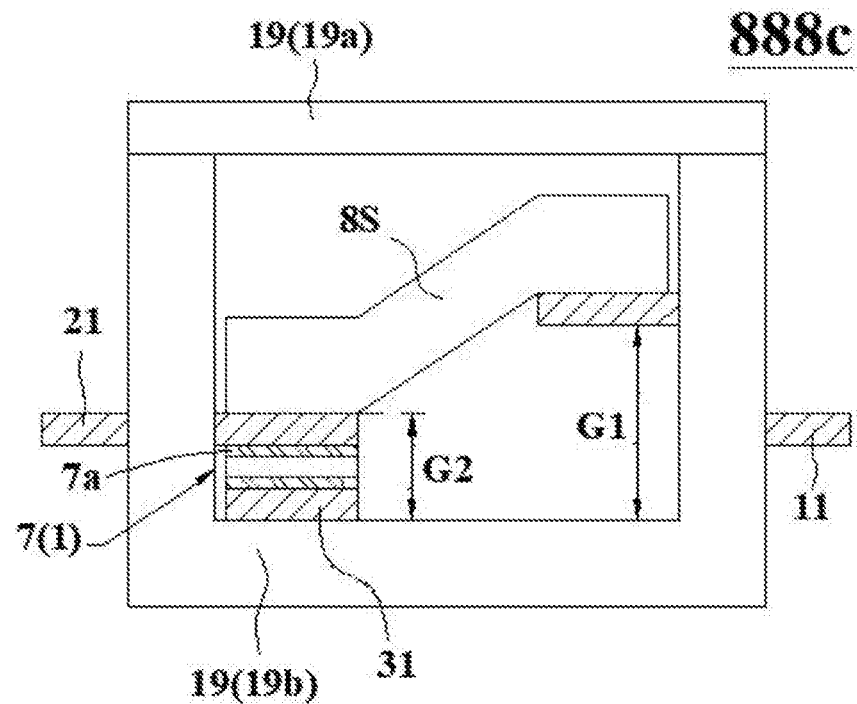
FIG. 1L is a cross-sectional view of the protection device 888c.
Figure 1M:
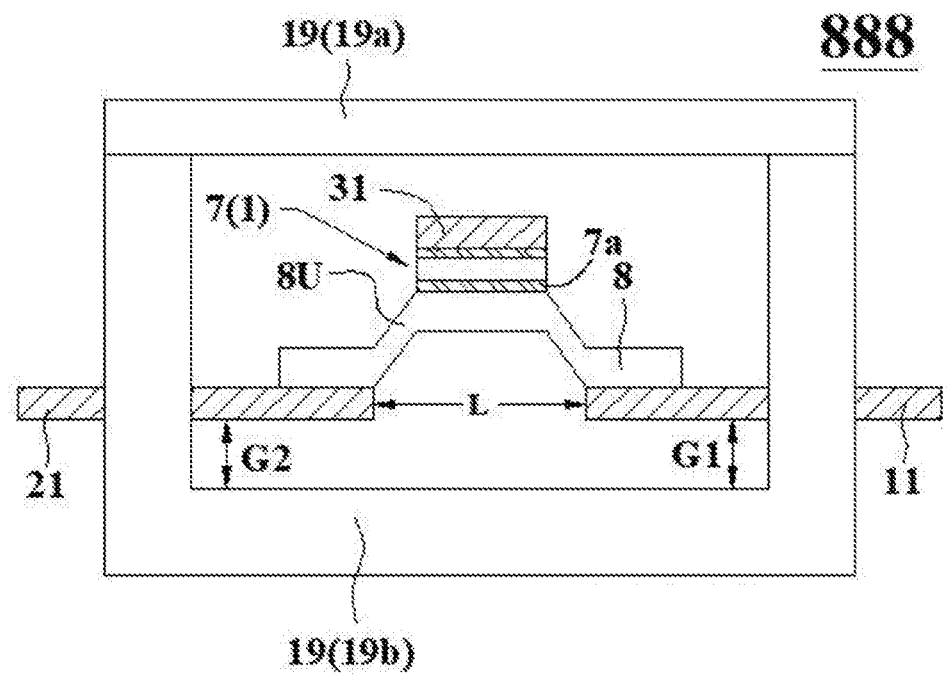
FIG. 1M is a cross-sectional view of the protection device 888.
Figure 1N:
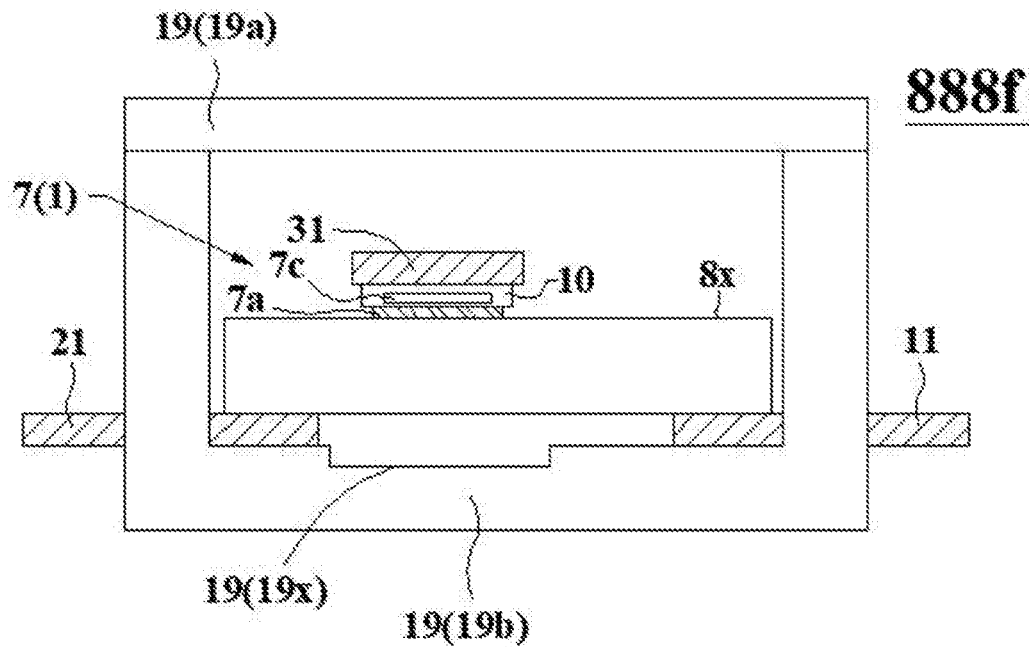
FIG. 1N is a cross-sectional view of a protection device 888f.
Figure 1O:
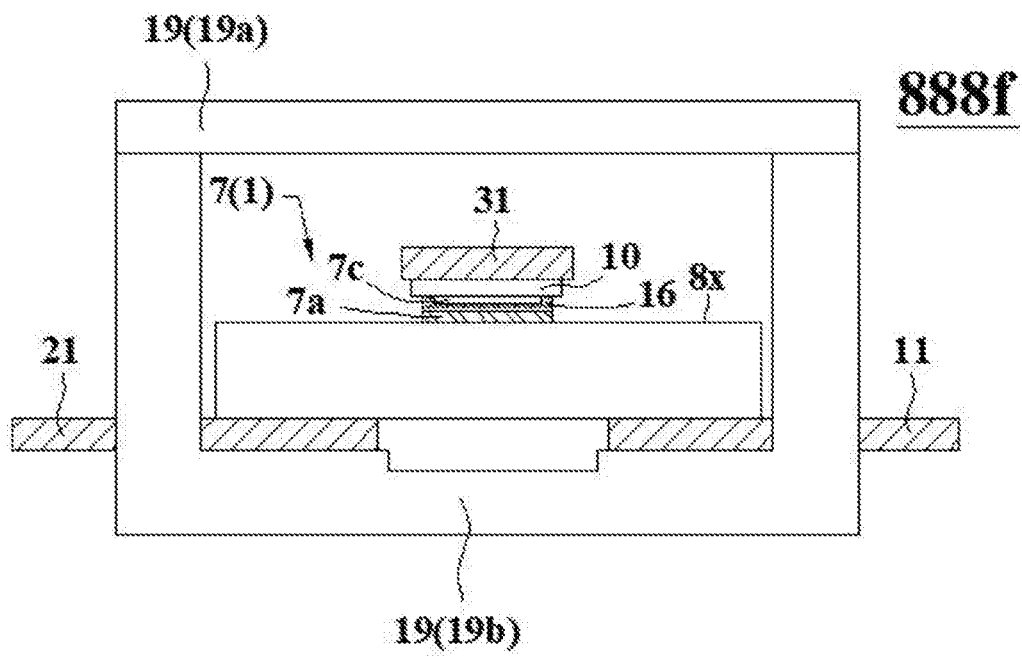
FIG. 1O is a cross-sectional view of the protection device 888f.
Figure 1P:
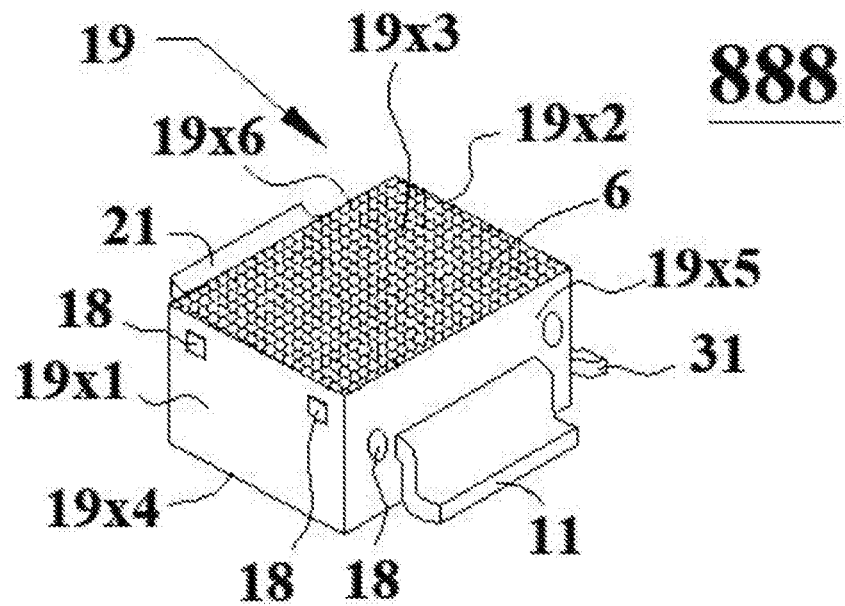
FIG. 1P is a schematic diagram of an appearance of an insulation casing.

Referring to FIG. 1P, the insulation casing 19 of the protection device 888 of the invention may have at least one opening 18 or a porous ceramic structure 6 on at least one surface portion of the above six surface portions. All of the protection devices of the invention are applicable. A technical feature of the at least one opening 18 or the porous ceramic structure 6 is that at the moment when the fusible conductor 8 is fused, phenomenon of gasification, gas explosion or flash or discharge is produced, especially when a rated voltage and a rated current of the protection device are all very high, in this case, a pressure within the insulation casing 19 is increased, and the at least one opening 18 or the porous ceramic structure 6 may properly release the above pressure, so as to avoid damaging the structure of the insulation casing 19. The opening 18 has a feature of penetrating through an inner surface and an outer surface of the insulation casing 19. The porous ceramic structure 6 has a feature that the insulation casing cover 19a or at least one surface portion (for example, 19x3) of the insulation casing 19 has the porous ceramic structure 6, and a main component thereof is ceramic powder, and the porous ceramic structure 6 is sintered through a sintering process, and gaps or pores are produced between ceramic particles, so that a minimum diameter of the pores of the porous ceramic structure 6 is smaller than a diameter of the opening 18 of the insulation casing 19. Alternatively, the number of the pores of the porous ceramic structure 6 is greater than the number of the openings 18 of the insulation casing 19, and most of the pores of the porous ceramic structure 6 are connected to each other. When the rated voltage value or the rated current value of the protection device 888 are relatively high (for example, greater than 30 A or 50 A or above 100 A), at the moment when the fusible conductor 8 is fused, a high pressure produced by gas may be evenly exhausted through the at least one opening 18 or the connected porous structure of the porous ceramic structure 6. The opening 18 of the insulation casing 19 penetrates through the outer surface of the insulation casing 19 to reach the inner surface thereof, for example, and has a minimum diameter of 0.05 mm or with a minimum side length of 0.05 mm. The pores of the porous ceramic structure 6 are not in a same size or magnitude, but are formed by different gaps (distances) between the ceramic particles. By viewing the porous ceramic structure 6 from the surface to internal of the insulation casing 19, the internal of the insulation casing 19 cannot be viewed even if a magnifier is used, and a manufacturing process of the porous ceramic structure 6 is to extrude the ceramic powder (for example, silicon carbide SiC) of high thermal conductivity and different particle sizes in a high pressure, and then rolling forming or pressure forming or blending the ceramic powder into slurry for injection forming is performed, and then a sintering process is performed to form the porous ceramic structure 6 with gaps therein. It should be noted that the porous ceramic structure 6 of the invention may be implemented on one or more of the six surfaces portions of the insulation casing 19 including the left surface portion 19x1, the right surface portion 19x2, the top surface portion 19x3, the bottom surface portion 19x4, the front surface portion 19x5 and the back surface portion 19x6, and it is not necessarily that the whole structure of a certain surface portion is the porous ceramic structure 6, and it is also possible that a part region of a certain surface portion has the porous ceramic structure 6.

[A Plurality of Terminal Electrodes]

The aforementioned three terminal electrodes (i.e. the first terminal electrode 11, the second terminal electrode 21, and the third terminal electrode 31) penetrate through the insulation casing base 19b and are supported by the insulation casing base 19b. One end (i.e. a first end) of each of the terminal electrodes (i.e. the first terminal electrode 11, the second terminal electrode 21, the third terminal electrode 31) is disposed (exposed) outside the insulation casing 19, and another end (a second end) is disposed (floated) in the insulation casing 19 or extends into the insulation casing 19. Further, a gap G1 (or referred to as a first gap) is formed between the second end of the first terminal electrode 11 and the insulation casing base 19b, and a gap G2 (or referred to as a second gap) is formed between the second end of the second terminal electrode 21 and the insulation casing base 19b, where the first gap G1 may be greater than or equal to (≥) the second gap G2 (referring to FIG. 1L, FIG. 1), alternatively, the first gap G1 is smaller than (<) the second gap G2 (not shown). Moreover, no object (for example, an insulating substrate) is configured between the second end of the first terminal electrode 11 and the second end of the second terminal electrode 21, and a distance or a gap or a region there between is L. In this way, since there is no plane or object between the first terminal electrode 11 and the second terminal electrode 21, after the fusible conductor 8 is fused, a situation that the first terminal electrode 11 and the second terminal electrode 21 are electrically connected by the melted or spattered fusible conductor 8 is avoided, such that after the fusible conductor 8 is fused, an insulating resistance between the first terminal electrode 11 and the second terminal electrode 21 may reach a high standard demand. Besides, since the aforementioned three terminal electrodes are not formed through a printing process but are formed through other process (for example, a lamination process), a designer may adjust a thickness and a density of the terminal electrodes according to an actual application or design requirement, so as to reduce an internal resistance of the terminal electrodes. A material of the terminal electrodes of the invention includes a plate-like or a strip-like metal made of a material that takes any one of gold, silver, copper, tin, lead, aluminum, nickel, palladium, platinum, etc. as a main component or taking a combination of a part of the above materials as the main component. Moreover, one layer of or multiple layers of a metal material that is more stable or not easy to be oxidized such as nickel, tin, lead, aluminum, nickel, gold, etc. may be coated on surfaces of the terminal electrodes. In this way, surface oxidation of the first terminal electrode 11 and the second terminal electrode 21 due to a high temperature produced when a large current flows through the first terminal electrode 11 and the second terminal electrode 21 is avoided, and when the fusible conductor 8 is fused, the fused fusible conductor 8 is more easy to be adsorbed on the first terminal electrode 11 or the second terminal electrode 21 to accelerate breaking of the fusible conductor 8. All of the terminal electrodes of the invention may be implemented by using the above method. Certainly, the protection device 888 of the invention may have no gap G1 or gap G2 or gap G1 and G2 (referring to FIG. 1L, 1N and FIG. 1O) as long as the distance L between the first terminal electrode 11 and the second terminal electrode 21 may be adjusted according to the rated voltage of the protection device 888, or an indent portion 19x is configured on the insulation casing base 19b between the first terminal electrode 11 and the second terminal electrode 21, such that the spattered or melted fusible conductor 8 is not easy to electrically connect the first terminal electrode 11 and the second terminal electrode 21. Moreover, the protection device 888 of the embodiment may not include the third terminal electrode 31, but only has the first terminal electrode 11 and the second terminal electrode 21 (referring to FIG. 1T and 1U). When a current between the first terminal electrode 11 and the second terminal electrode 21 is abnormal or exceeds the rated current of the protection device 888 or 888a, the fusible conductor 8 is fused due to its own heat (referring to FIG. 1F and FIG. 1G) to achieve an overcurrent protection function.

[Terminal Electrode has a Bevel]

Further, referring to FIG. 1C or FIG. 1J, the first terminal electrode 11 of the protection devices 888b and 888d of one implementation may have at least one bevel 11a, and a feature thereof is that when the first heat generating element 7(1) produces heat, the fusible conductor 8 located on the first terminal electrode 11 may be fused, and the fused fusible conductor 8 may be adsorbed on the first terminal electrode 11, and is meanwhile diverted down to the underneath or a surface of the bevel (referring to FIG. 1J) along the bevel 11a, so as to accelerate a speed of fusing the fusible conductor 8. Certainly, the bevel 11a may also be adapted to other electrodes (for example, the second electrode 21).

[Fusible Conductor]

The fusible conductor 8 is disposed in the insulation casing 19. The fusible conductor 8 may be a multi-layer structure including a low melting point conductor layer and a high melting point conductor layer, where melting points of the low melting point conductor layer and the high melting point conductor layer are different. Certainly, the fusible conductor 8 may be a single layer structure that only includes a single melting point metal conductor layer (the low melting point conductor layer or the high melting point conductor layer). A material of the low melting point conductor layer in the fusible conductor 8 includes a lead-based or lead-free metal alloy that takes tin as a main component. A material of the high melting point conductor layer in the fusible conductor 8 includes an alloy consisting of any one or more of silver, copper, tin, bismuth, indium, zinc, aluminum, etc. All of the fusible conductors of the invention are adapted to the above description. Referring to FIG. 1, the two ends of the fusible conductor 8 are electrically connected to the first terminal electrode 11 and the second terminal electrode 21 respectively, so as form a two-way current path (Ic, Id) between the first terminal electrode 11 and the second terminal electrode 21. It should be noted that a lower surface 8$y$ of one of the two ends of the fusible conductor 8 is fixed on an upper surface 11$x$ of the first terminal electrode 11 through a solder, and is electrically connected to the first terminal electrode 11, and the lower surface 8$y$ of the other end is fixed on an upper surface 21$x$ of the second terminal electrode 21 through the solder, and is electrically connected to the second terminal electrode 21, The fusible conductor 8 is supported by the first terminal electrode 11 and the second terminal electrode 21. The fusible conductor 8 and the insulation casing base 19$b$ have a gap there between (referring to FIG. 1), such that after the fusible conductor 8 is fused, insulation between the first terminal electrode 11 and the second terminal electrode 21 is ensured. Moreover, it should be noted that a resistance R of the fusible conductor 8 is complied with a following equation: $R=\rho L \div A$, where $\rho$ is a resistance coefficient, A is a cross-sectional area of the fusible conductor 8, and L is a length of the fusible conductor 8. It is assumed that $\rho$, A are fixed values, the longer the length L is, the greater the resistance of the fusible conductor 8 is, and the smaller a current that may flow through the fusible conductor 8 is. Therefore, if the length L of the fusible conductor 8 is shortened, the current that may flow through the fusible conductor 8 is increased. The cross-sectional area A of the fusible conductor 8 of the embodiment is equal to a width W of the fusible conductor 8 multiplied by a thickness H (referring to FIG. 1C) of the fusible conductor 8, it is assumed that $\rho$, L are fixed values, by increasing the width W of the fusible conductor 8 and the thickness H of the fusible conductor 8, the cross-sectional area A of the fusible conductor 8 may be increased, and the larger the cross-sectional area A of the fusible conductor 8 is, the smaller the resistance of the fusible conductor 8 is, and the larger the current that may flow through the fusible conductor 8 is. Since there is no any object (for example, a substrate) located between the first terminal electrode 11 and the second terminal electrode 21 of all of the protection devices of the invention, a resistance of an overlapped part of the fusible conductor 8 and the first terminal electrode 11 and a resistance of an overlapped part of the fusible conductor 8 and the second terminal electrode 21 are very small, which may be neglected, so that the length L of the fusible conductor 8 is shorter than that of the conventional technique where the first terminal electrode 11 and the second terminal electrode 21 have an insulating substrate there between, comparatively, the current that may flow through the fusible conductor 8 is increased. The structure of the protection device of the invention is more adapted to applications of the protection device and the battery pack that require a large current.

Referring to FIG. 1L, FIG. 1M, which illustrate the fusible conductor 8 of the protection devices 888 and 888$c$ of an implementation of the invention, where a portion of the fusible conductor 8 between the first terminal electrode 11 and the second terminal electrode 21 may have a bevel portion 8S (shown in FIG. 1L) or a protruding portion 8U (shown in FIG. 1M).

[The First Heat Generating Element 7(1) is Disposed on or Coupled to a Surface of the Fusible Conductor 8]

Referring to FIG. 1, the first heat generating element 7(1) of the protection device 888 is disposed on or is coupled to an upper surface 8$x$ of the fusible conductor 8 at a central portion, where the first heat generating element 7(1) includes two heater electrodes 7$a$, 7$b$ and a first heater 7$c$. The above three parts (i.e. the heater electrodes 7$a$, 7$b$ and the first heater 7$c$) form a so-called sandwich structure, where the first heater 7$c$ is clamped between the two heater electrodes 7$a$, 7$b$ (referring to FIG. 1). One end of the first heater 7$c$ is electrically connected to the heater electrode 7$a$, and the other end thereof is electrically connected to the heater electrode 7$b$. It should be noted that the heater electrode 7$a$ of the embodiment is coupled to or fixed to the upper surface 8$x$ of the fusible conductor 8 through the solder, and is electrically connected to the fusible conductor 8. The heater electrode 7$b$ is coupled to or fixed to the third terminal electrode 31 through the solder and is electrically connected to the third terminal electrode 31. The first heat generating element 7(1) may be supported by the fusible conductor 8. Moreover, the first heat generating element 7(1) and the second end of the first terminal electrode 11 is separated by the fusible conductor 8, and the first heat generating element 7(1) and the second end of the second terminal electrode 21 is separated by the fusible conductor 8. The first heater 7$c$ is an element with a higher resistance (compared to the fusible conductor 8), and has a feature of heating when a current passes there through. A main component of a material of the first heater 7$c$ includes one of ruthenium dioxide ($RuO_2$), ruthenium oxide, zinc oxide, ruthenium, copper, palladium, platinum, titanium carbide, tungsten carbide, platinum, molybdenum, tungsten, carbon black, organic binder, and inorganic binder, etc., or includes a combination of a part of the above elements and compounds. The heater electrodes 7$a$, 7$b$ may be a single layer metal or multi-layer metal structure, and a material of each layer includes one of copper, tin, lead, iron, nickel, aluminium, titanium, platinum, tungsten, zinc, ruthenium, cobalt, palladium, silver, gold, iron carbonyl, nickel carbonyl, cobalt carbonyl, etc., or an alloy consisting of a part of the above elements. It should be noted that the first heat generating element 7(1) may also be disposed on a side surface (referring to FIG. 1T, FIG. 1U) or at a side (referring to FIG. 1S) of the fusible conductor 8, where the first heater electrode 7$a$ may be coupled to or fixed on the upper surface 8$x$ of the fusible conductor 8 through the solder, and is electrically connected to the fusible conductor 8 (referring to FIG. 1S). Certainly, the heater electrode 7$a$ may also be coupled to or fixed on the lower surface 8$y$ or the side surface of the fusible conductor 8 through the solder (referring to FIG. 1T, FIG. 1U).

Figure 2A:
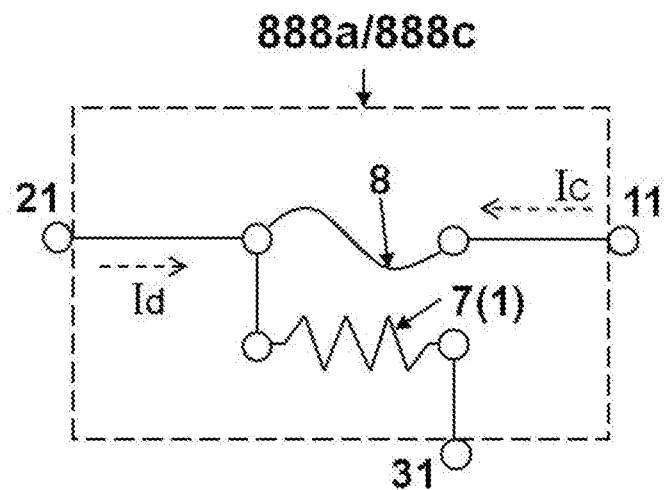
FIG. 2A is an equivalent circuit diagram of a protection device.
Figure 2B:
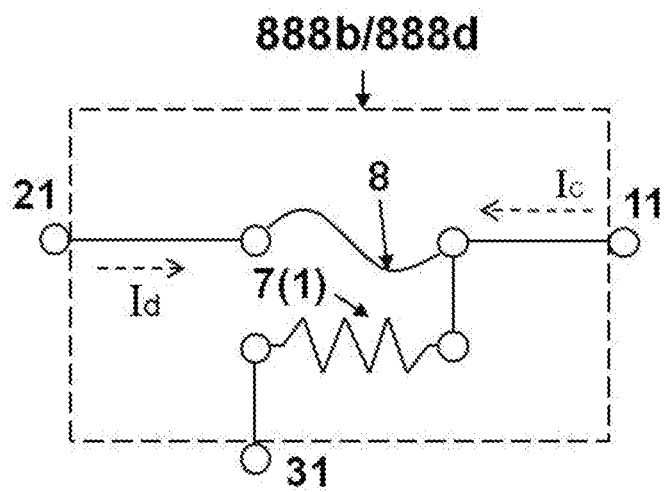
FIG. 2B is an equivalent circuit diagram of a protection device.

Further, referring to FIG. 1B, the first heat generating element 7(1) of the protection device 888$b$ of an implementation of the invention may be coupled to or disposed on the upper surface 8$x$ of one end of the fusible conductor 8, alternatively, the first heat generating element 7(1) may be coupled to or disposed on the upper surface 8$x$ of the fusible conductor 8 at an overlapped region of the first terminal electrode 11 and the fusible conductor 8, where an orthogonal projection of the first heat generating element 7(1) on the fusible conductor 8 and an orthogonal projection of the first terminal electrode 11 on the fusible conductor 8 are at least partially overlapped. Moreover, the first heat generating element 7(1) and the second end of the first terminal electrode 11 are separated by the fusible conductor 8. Referring to FIG. 2B, FIG. 2B is an equivalent circuit diagram of the protection device 888b.

Further, referring to FIG. 1A, the first heat generating element 7(1) of the protection device 888a of an implementation of the invention may be coupled to or disposed on the upper surface 8x of the other end of the fusible conductor 8, alternatively, the first heat generating element 7(1) may be coupled to or disposed on the upper surface 8x of the fusible conductor 8 at an overlapped region of the second terminal electrode 21 and the fusible conductor 8, where an orthogonal projection of the first heat generating element 7(1) on the fusible conductor 8 and an orthogonal projection of the second terminal electrode 21 on the fusible conductor 8 are at least partially overlapped. Moreover, the first heat generating element 7(1) and the second end of the second terminal electrode 21 are separated by the fusible conductor 8. Referring to FIG. 2A, FIG. 2A is an equivalent circuit diagram of the protection device 888a.

Therefore, according to the above description, the first heat generating element 7(1) of the invention may be coupled to or disposed at any positron of the upper surface 8x of the fusible conductor 8.

[First Heat Generating Element 7(1) is Coupled to or Disposed on a Surface of the Terminal Electrode]

Further, referring to FIG. 1E, the first heat generating element 7(1) of the protection device 888d of an implementation of the invention may be coupled to or disposed on a lower surface 11y of the first terminal electrode 11, alternatively, the first heat generating element 7(1) is coupled to or disposed on the lower surface 11y of the first terminal electrode 11 at an overlapped region of the first terminal electrode 11 and the fusible conductor 8, where an orthogonal projection of the first heat generating element 7(1) on the first terminal electrode 11 and an orthogonal projection of the fusible conductor 8 on the first terminal electrode 11 are at least partially overlapped. Referring to FIG. 2B, FIG. 2B is an equivalent circuit diagram of the protection device 888d.

Further, referring to FIG. 1D, the first heat generating element 7(1) of a protection device 888c of an implementation of the invention may be coupled to or disposed on a lower surface 21y of the second terminal electrode 21, alternatively, the first heat generating element 7(1) is coupled to or disposed on the lower surface 21y of the second terminal electrode 21 at an overlapped region of the second terminal electrode 21 and the fusible conductor 8, where an orthogonal projection of the first heat generating element 7(1) on the second terminal electrode 21 and an orthogonal projection of the fusible conductor 8 on the second terminal electrode 21 are at least partially overlapped. Referring to FIG. 2A, FIG. 2A is an equivalent circuit diagram of the protection device 888c.

Since there is no object located at a lower part between the first terminal electrode 11 and the second terminal electrode 21, the melted or spattered fusible conductor 8 may not cause any problem. Certainly, the first heat generating element 7(1) may be coupled to or disposed on the upper surface 11x of the first terminal electrode 11, alternatively, coupled to or disposed on the upper surface 21x of the second terminal electrode 21, and it is only required to adjust a configuration position of the fusible conductor 8.

[Insulating Substrate]

Further, referring to FIG. 1N and FIG. 1O, which illustrate a protection device 888f of one implementation of the invention. The protection device 888f is similar to the protection device 888, and a difference there between is that the protection device 888f further includes an insulating substrate 10, and the first heat generating element 7(1) may be disposed on the insulating substrate 10 or in the insulating substrate 10. It should be noted that the insulating substrate 10 of the invention is not disposed between the first terminal electrode 11 and the second terminal electrode 21, and below the fusible conductor 8, so that the melted and spattered fusible conductor 8 does not influence an insulation feature of the fused fusible conductor 8. There is no gap between the first terminal electrode 11 and the insulation casing base 19b, and there is also no gap between the second terminal electrode 21 and the insulation casing base 19b. Considering the liquid-state spattered fusible conductor 8, an indent portion 19x may be configured on the insulation casing 19, such that the melted fusible conductor 8 is not easy to be attached between the first terminal electrode 11 and the second terminal electrode 21. Certainly, the first terminal electrode 11 and the second terminal electrode 21 of the protection device 888f may also have a first gap and a second gap similar to that of the protection device 888. Moreover, in FIG. 1N, the heater electrode 7a is coupled to and electrically connected to the upper surface 8x of the fusible conductor 8 between a central portion of the fusible conductor 8 and the second terminal electrode 21. The heater electrode 7b is coupled to and electrically connected to the third terminal electrode 31. Certainly, the heater electrode 7a may also be coupled to and electrically connected to the upper surface 8x of the fusible conductor 8 between the central portion and the first terminal electrode 11. Moreover, the heater electrode 7a may also be coupled to and electrically connected to the central portion of the fusible conductor 8 (referring to FIG. 1O). It should be noted that since the heater electrode 7a is coupled to and electrically connected to the upper surface 8x of the fusible conductor 8 at a position between the central portion and the second terminal electrode 21, a resistance of the fusible conductor 8 located between the heater electrode 7a and the second terminal electrode 21 may be lower than or smaller than a resistance of the fusible conductor 8 located between the heater electrode 7a and the first terminal electrode 11, alternatively, a length of the fusible conductor 8 located between the heater electrode 7a and the second terminal electrode 21 may be shorter than or smaller than a length of the fusible conductor 8 located between the heater electrode 7a and the first terminal electrode 11, alternatively, when a current greater than the rated current flows through the fusible conductor 8, the fusible conductor 8 located between the heater electrode 7a and the first terminal electrode 11 is fused (since a heat dissipation condition of the fusible conductor 8 located between the heater electrode 7a and the second terminal electrode 21 is superior to a heat dissipation condition of the fusible conductor 8 located between the heater electrode 7a and the first terminal electrode 11). Certainly, if the heater electrode 7a is coupled to and electrically connected to the central portion of the fusible conductor 8, features of the two fusible conductors 8 located at two sides of the heater electrode 7a are substantially the same. The insulating substrate 10 is adapted to all of the protection devices of the invention.

[Adsorption Electrode]

Further, referring to FIG. 1K, which illustrates a protection device 888e of an implementation of the invention. The protection device 888e is similar to the protection device 888, and a difference there between is that the protection device 888e further includes an adsorption electrode 7z. An upper surface 7z1 of the adsorption electrode 7z is coupled to or disposed on the lower surface 8y of the fusible conductor 8, alternatively, one end of the adsorption electrode 7z is coupled to the lower surface 8y of the fusible conductor 8, and the other end thereof is coupled to one end of the first heat generating element 7(1) (the heater electrode 7a) or the insulation casing 19 (a lower surface 7z2 of the adsorption electrode 7z is coupled to the insulation casing 19). A main effect of the adsorption electrode 7z is that when the first heat generating element 7(1) produces heat, the heat is transferred to the fusible conductor 8, and is then transferred to the adsorption electrode 7z from the fusible conductor 8, and after the central portion of the fusible conductor 8 is substantially melted, the melted part may flow downwards along the adsorption electrode 7z, so as to accelerate the speed of fusing the fusible conductor 8. Moreover, if the other end of the adsorption electrode 7z is coupled to one end of the first heat generating element 7(1), the heat generated by the first heat generating element 7(1) may simultaneously heat the upper surface and the lower surface of the fusible conductor 8, such that the speed of fusing the fusible conductor 8 is faster.

[Second Fusible Conductor, Second Adsorption Electrode, Bevel]

Figure 1Q:
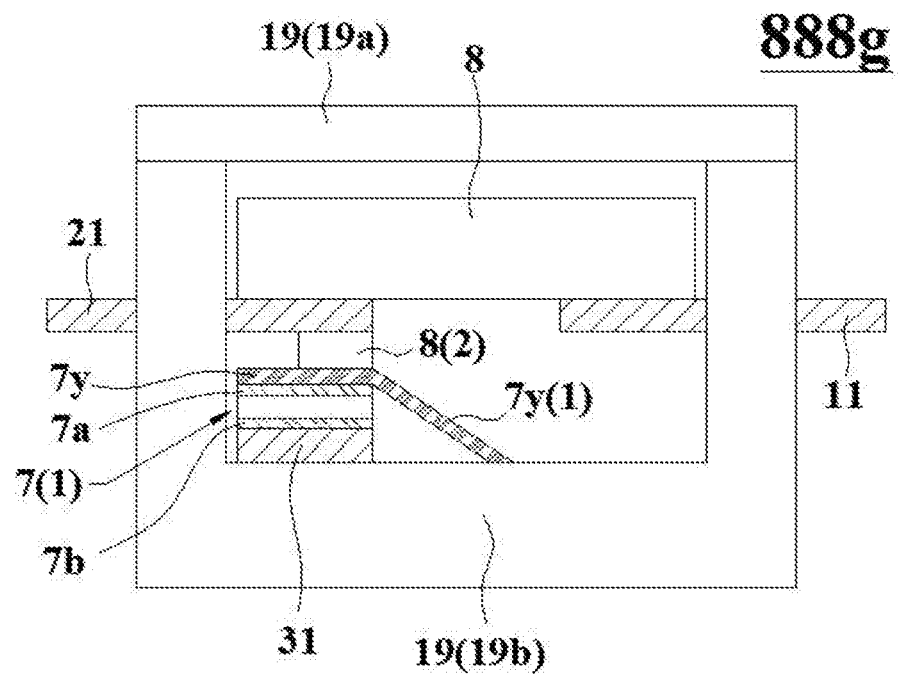
FIG. 1Q is a cross-sectional view of a protection device 888g.
Figure 1R:
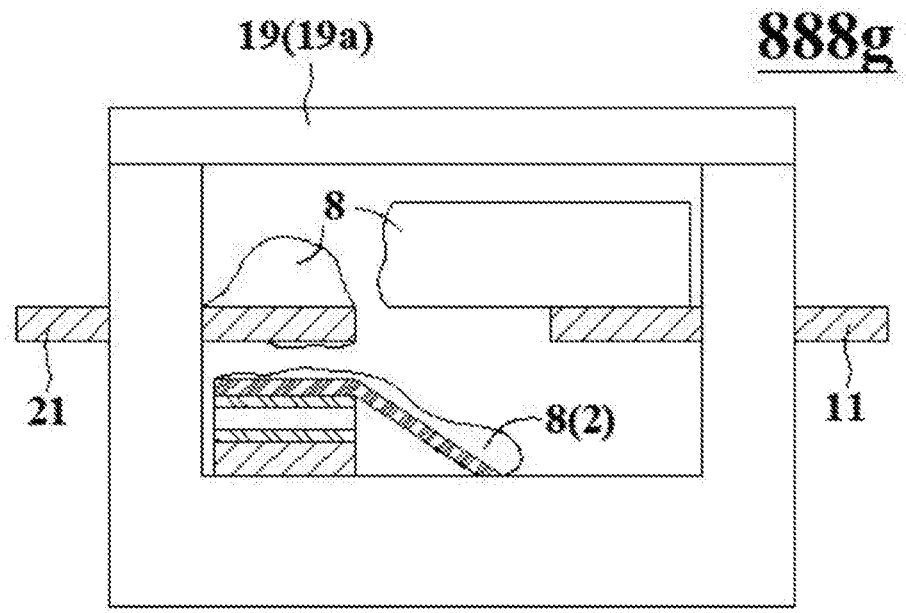
FIG. 1R is a cross-sectional view of the protection device 888g after the fusible conductor and a second fusible conductor are fused.
Figure 1S:
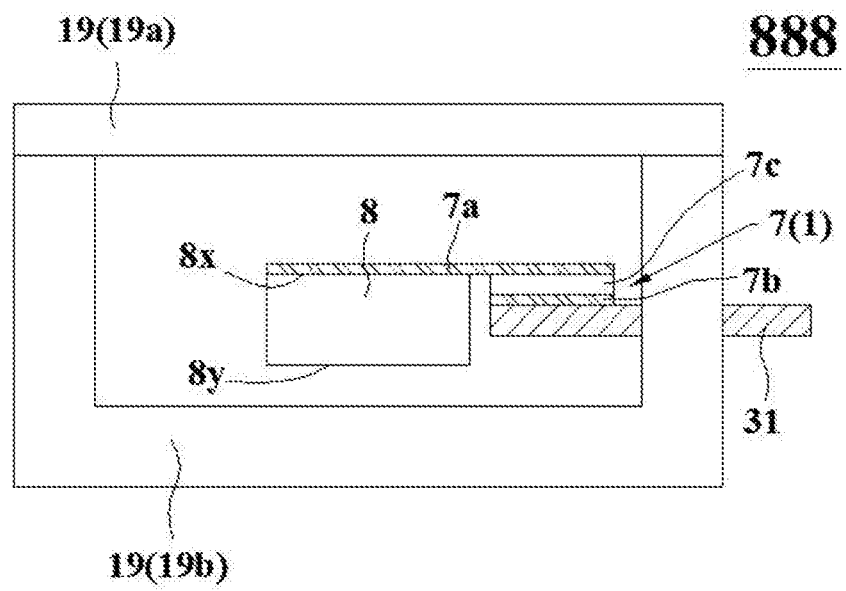
FIG. 1S is a cross-sectional view of the protection device 888 facing the front surface portion 19x5 of FIG. 1P.
Figure 1T:
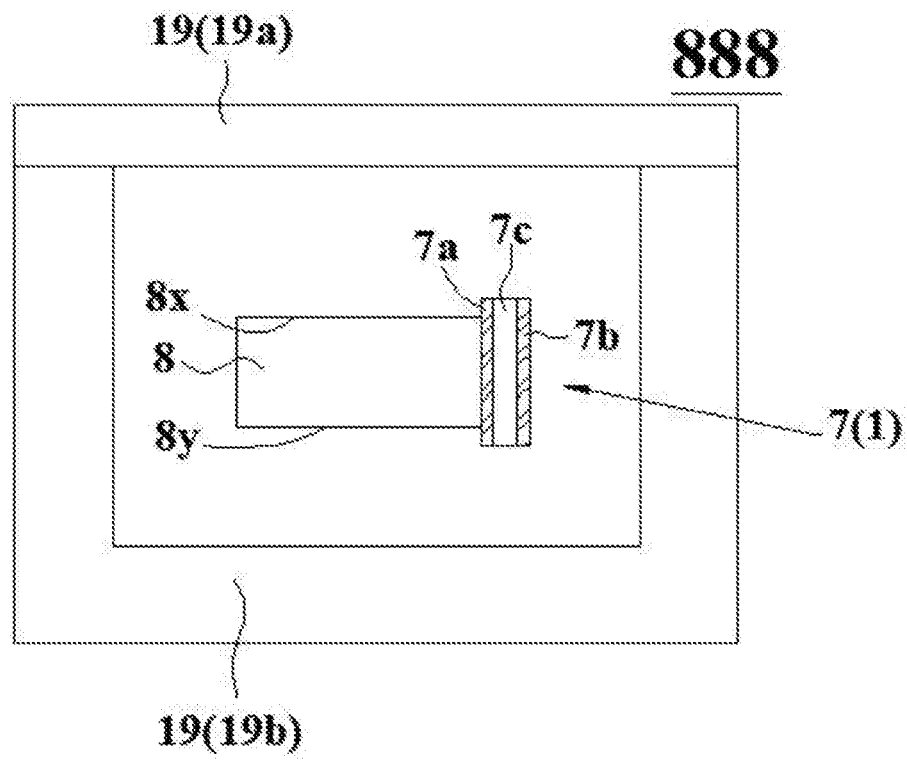
FIG. 1T is a cross-sectional view of the protection device 888 facing the front surface portion 19x5 of FIG. 1P.
Figure 1U:
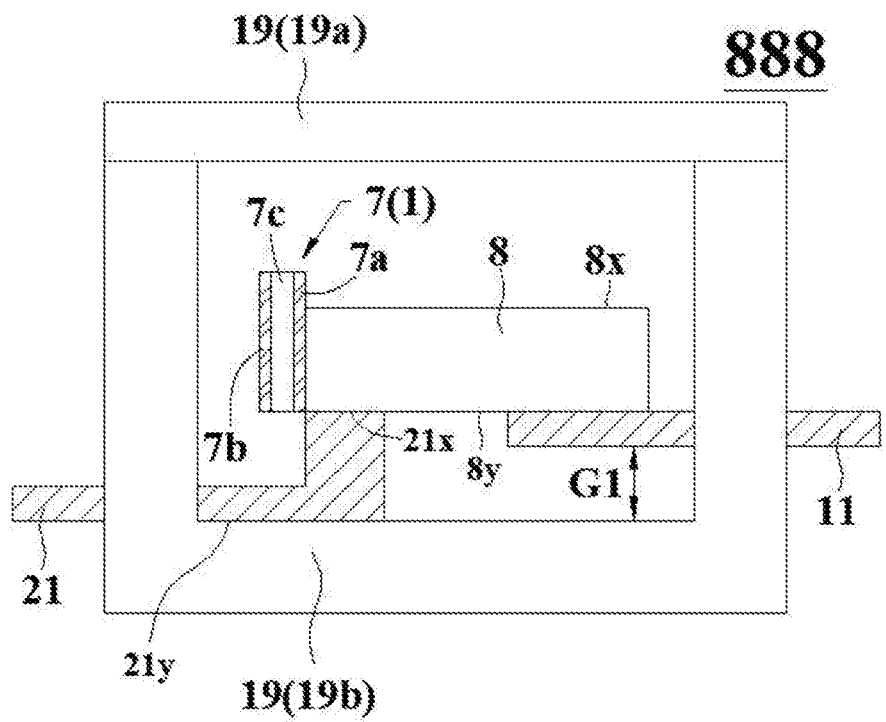
FIG. 1U is a cross-sectional view of the protection device 888.
Figure 1V:
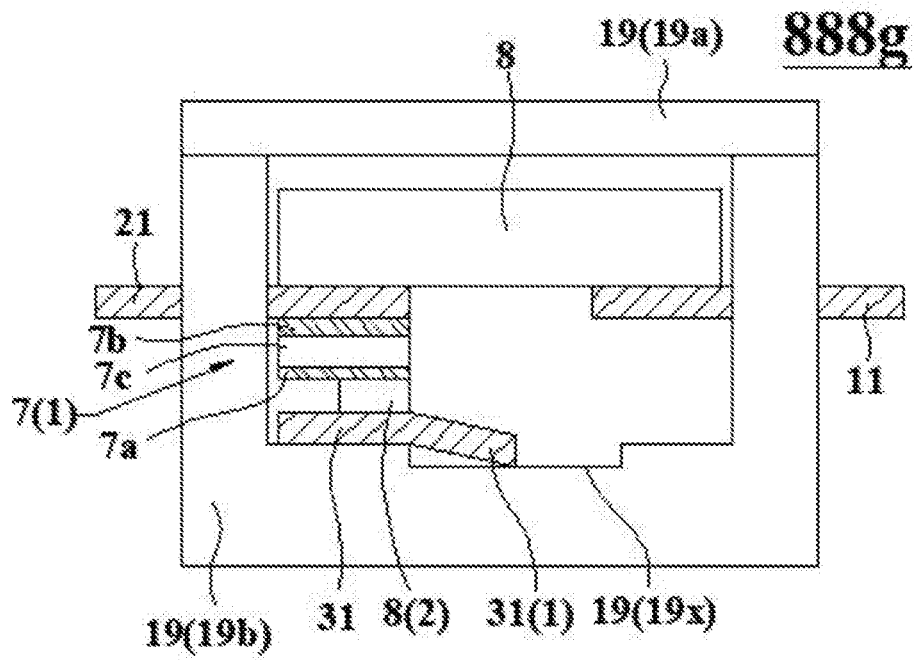
FIG. 1V is a cross-sectional view of a protection device 888g.
Figure 2C:
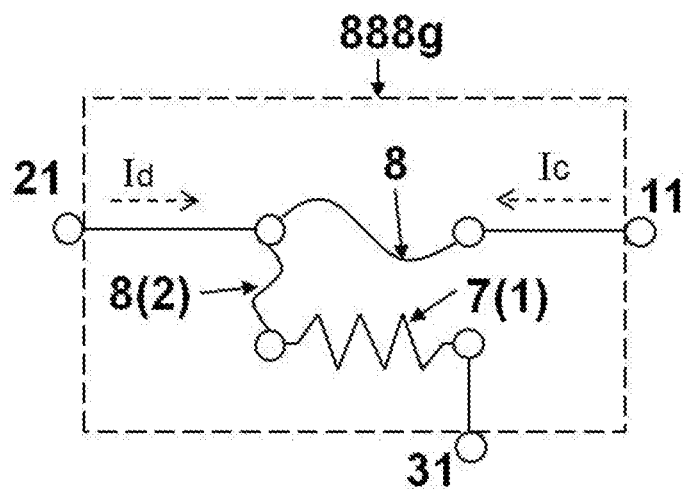
FIG. 2C is an equivalent circuit diagram of a protection device.
Figure 2D:
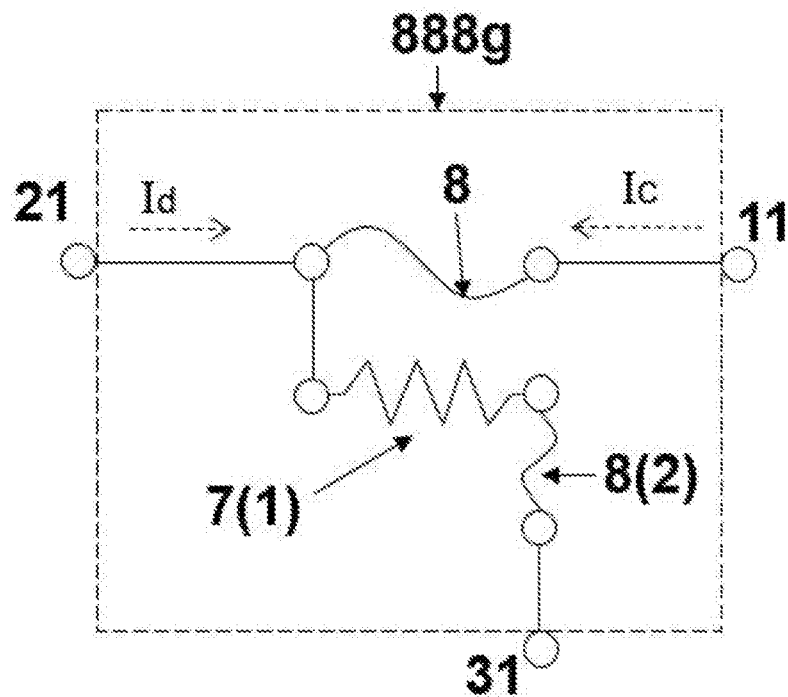
FIG. 2D is an equivalent circuit diagram of a protection device.
Figure 2E:
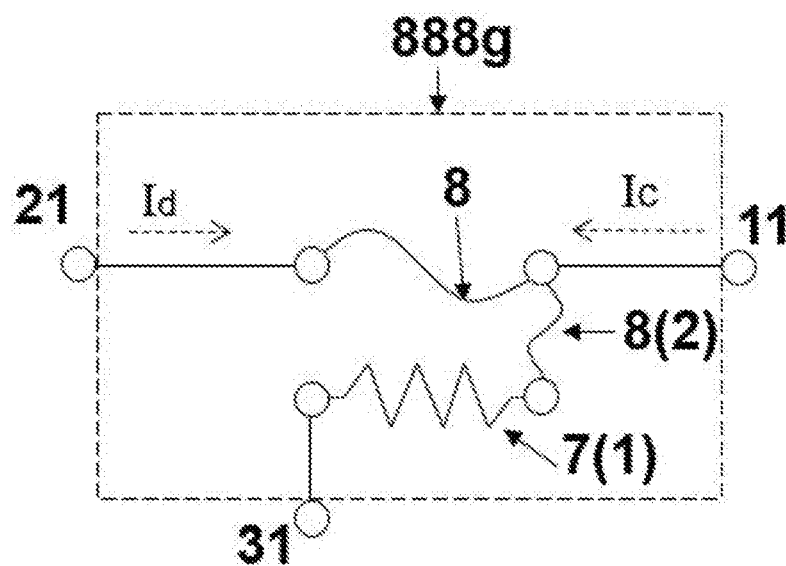
FIG. 2E is an equivalent circuit diagram of a protection device.

Moreover, referring to FIG. 1Q, which illustrates a protection device 888g of an implementation of the invention. FIG. 2C illustrates an equivalent circuit diagram of the protection device 888g. The protection device 888g is similar to the protection device 888c, and a difference there between is that the protection device 888g further includes a second fusible conductor 8(2). One end of the second fusible conductor 8(2) is electrically connected to the second terminal electrode 21, and the other end is electrically connected to the first heat generating element 7(1), and one end of the first heat generating element 7(1) is electrically connected to the third terminal electrode 31. In other words, the second fusible conductor 8(2) and the first heat generating element 7(1) are electrically connected in series between the two-way current path (i.e. a path of a current $I_c$ and a current $I_d$) and the third terminal electrode 31 (referring to FIG. 1Q, FIG. 1V, FIG. 2C, FIG. 2D, FIG. 2E). Referring to FIG. 1R, FIG. 1R is a cross-sectional view of the fused fusible conductor 8 and the fused second fusible conductor 8(2). When the first heat generating element 7(1) produces heat, the fusible conductor 8 is first fused, and then the second fusible conductor 8(2) is fused. There are many methods of fusing the fusible conductor 8 and the second fusible conductor 8(2) in succession is plural, and one method is that a melting point or a liquefaction point of the second fusible conductor 8(2) is higher than a melting point or a liquefaction point of the fusible conductor 8. The rated current of the fusible conductor 8 may be greater than or equal to (≥) a rated current of the second fusible conductor 8(2), alternatively, the rated current of the fusible conductor 8 is smaller than (<) the rated current of the second fusible conductor 8(2). Further, the protection device 888g further includes a second adsorption electrode 7y, where one end thereof is electrically connected to the second fusible conductor 8(2), and the other end thereof is electrically connected to the first heat generating element 7(1). The second adsorption electrode 7y may have a bevel 7y(1), or does not have the bevel 7y(1). An effect of the second adsorption electrode 7y is to absorb the fused second fusible conductor 8(2). The second adsorption electrode 7y having the bevel 7y(1) may accelerate the speed of fusing the second fusible conductor 8(2). It should be noted that the protection device 888g may also not include the second adsorption electrode 7y. The terminal electrodes 11, 21, and 31 of the invention may also have bevels, for example, the third terminal electrode 31 has a bevel 31(1) (referring to FIG. 1V), and an effect of the bevel 31(1) of the third terminal electrode 31 of FIG. 1V is the same to that of the bevel 7y(1) of the second adsorption electrode 7y of FIG. 1Q. In addition, the protection device 888 in FIG. 1 may further include a adsorption electrode which is similar to the second adsorption electrode 7y of FIG. 1Q, where one end of the adsorption electrode of the protection device 888 is electrically connected to the fusible conductor 8, and the other end of the adsorption electrode of the protection device 888 is electrically connected to the first heat generating element 7(1).

[Operation of the Protection Device]

Referring to FIG. 1, when a current lower than the rated current value flows through the fusible conductor 8, the protection device 888 does not perform protecting operate, and an original state of the protection device 888 is maintained. Referring to FIG. 1F and FIG. 1G, when a current higher than the rated current value flows through the fusible conductor 8, the fusible conductor 8 is fused due to its own heat. Therefore, the current path between the first terminal electrode 11 and the second terminal electrode 21 is cut. In FIG. 1F, the fused portion of the fusible conductor 8 is located at a position between the first heat generating element 7(1) and the first terminal electrode 11. Certainly, the fused portion may be located at a position between the first heat generating element 7(1) and the second terminal electrode 21 (not shown). Alternatively, as shown in FIG. 1G, the fused portion of the fusible conductor 8 is located above a position between the first terminal electrode 11 and the second terminal electrode 21.

Referring to FIG. 1H, FIG. 1I, FIG. 1J and FIG. 1K, when the first heat generating element 7(1) produces heat, the fusible conductor 8 is fused, and a part of the fused fusible conductor 8 is adsorbed on the heater electrode 7a, alternatively, a part of the fused fusible conductor 8 is adsorbed between the heater electrode 7a and the second terminal electrode 21 (referring to FIG. 1H), alternatively, a part of the fused fusible conductor 8 is adsorbed between the heater electrode 7a and the first terminal electrode 11, alternatively, a part of the fused fusible conductor 8 is adsorbed on the second terminal electrode 21 or on the first terminal electrode 11 (referring to FIG. 1I, FIG. 1J), alternatively, a part of the fused fusible conductor 8 is adsorbed between the heater electrode 7a and the adsorption electrode 7z (referring to FIG. 1K). Therefore, the current path between the first terminal electrode 11 and the second terminal electrode 21 is opened.

Figure 3:
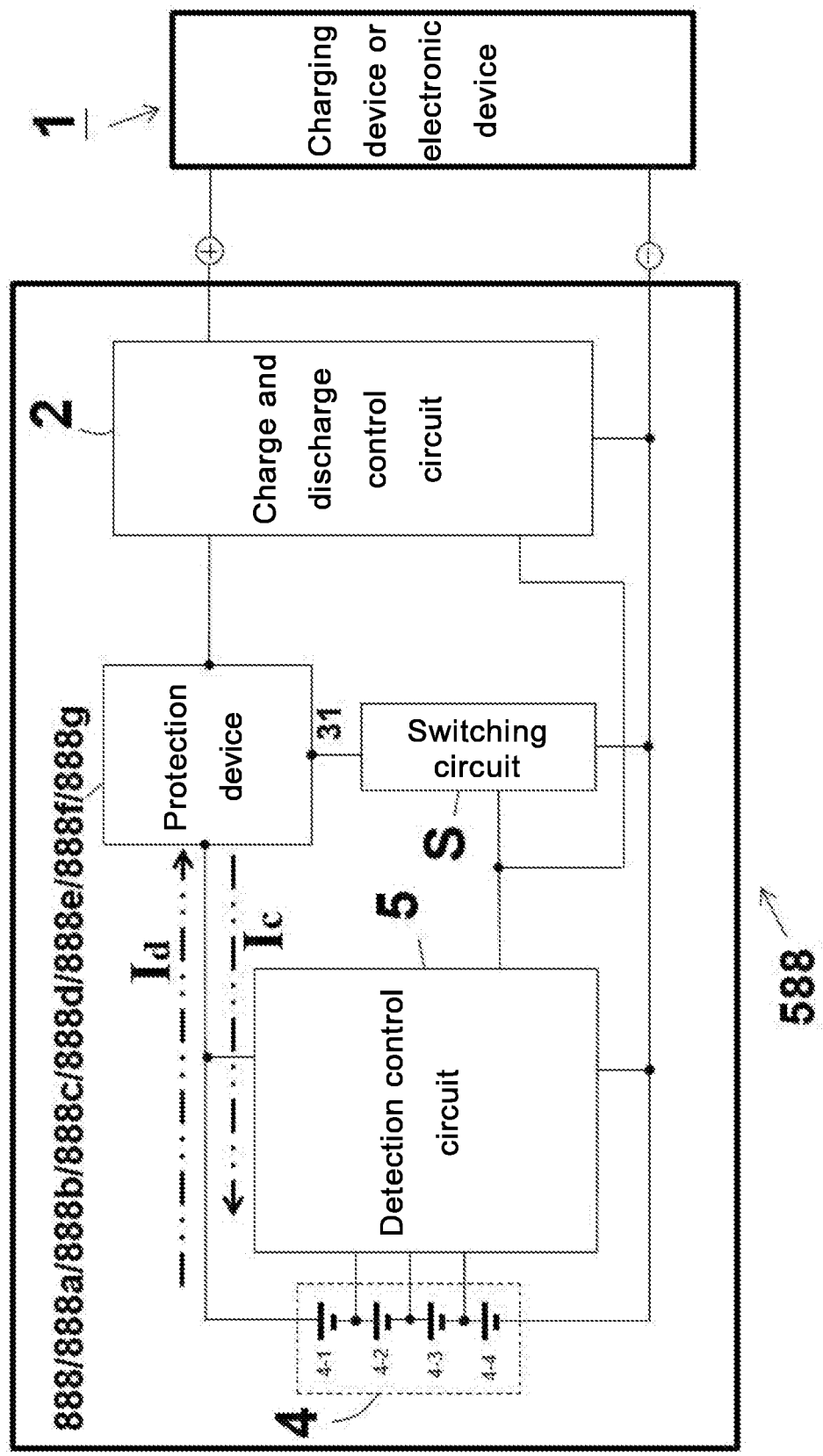
FIG. 3 is a circuit block diagram of a battery pack 588.

FIG. 3 is a circuit block diagram of a battery pack 588 according to an embodiment of the invention. The battery pack 588 includes a battery element group 4, a charge and discharge control circuit 2, a detection control circuit 5, a switching circuit S and the aforementioned protection device 888, 888a, 888b, 888c, 888d, 888e, 888f, or 888g. The battery element group 4 has four battery elements 4-1, 4-2, 4-3, 4-4 (though the invention is not limited thereto). The charge and discharge control circuit 2 controls enabling or disabling of a charge or discharge current ($I_c$, $I_d$). An initial state of the switching circuit S is an open circuit, in this case, the current cannot pass through the first heat generating element 7(1), and the switching circuit S may be turned on according to an input signal of the detection control circuit 5. The detection control circuit 5 respectively detects a voltage value or a temperature value of each of the battery elements 4-1, 4-2, 4-3, 4-4 in the battery element group 4, and outputs a signal to the charge and discharge control circuit 2 or the switching circuit S. The terminal electrodes 11, 21 of the protection device 888 are connected in series between the battery element group 4 and the charge and discharge control circuit 2 to form a charge or discharge path (a path of the current $I_c$ and the current $I_d$) or a two-way current path. The charge and discharge control circuit 2 in the rechargeable battery pack 588 of the embodiment may enable or disable the current for charging or discharging according to whether a connected device is a charging device 1 or an electronic device 1 and the signal output by the detection control circuit 5. When the charging current $I_c$ higher than the rated current value flows through the fusible conductor 8 or the discharging current $I_d$ higher than the rated current value flows through the fusible conductor 8, the fusible conductor 8 is fused to disconnect the path of the charging current $I_c$ or the discharging current $I_d$, so as to achieve an over-current protection function for protecting the battery element group 4 or the battery pack 588. Moreover, when the detection control circuit 5 detects abnormity (for example, overcharge or over-temperature) of any one of the battery elements 4-1, 4-2, 4-3, 4-4, the detection control circuit 5 sends a signal to the switching circuit S to switch the switching circuit S to a turn-on state, such that the current may flow through the first heat generating element 7(1). The first heater 7c produces heat under electricity to fuse the fusible conductor 8, so as to disable the charging current $I_c$ and the discharging current $I_d$ to achieve the overcharge, over-voltage or over-temperature protection function of the rechargeable battery pack 588.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A protection device, comprising:
   a plurality of terminal electrodes, comprising a first terminal electrode and a second terminal electrode;
   a fusible conductor, wherein a lower surface of the fusible conductor is respectively disposed on the first terminal electrode and the second terminal electrode, and the fusible conductor is supported by the first terminal electrode and the second terminal electrode, and two ends of the fusible conductor are electrically connected to the first terminal electrode and the second terminal electrode, respectively, so as to form a two-way current path between the first terminal electrode and the second terminal electrode; and
   a first heat generating element, wherein one end of the first heat generating element is coupled to another surface of the fusible conductor different to the lower surface of the fusible conductor, or one end of the first heat generating element is coupled to a surface of any one of the first terminal electrode and the second terminal electrode.

2. The protection device as claimed in claim 1, further comprising an insulation casing, wherein a gap is existed between the insulation casing and at least one of the first terminal electrode and the second terminal electrode.

3. The protection device as claimed in claim 1, wherein the first heat generating element comprises two heater electrodes and a first heater, and the two heater electrodes and the first heater construct a sandwich structure.

4. The protection device as claimed in claim 1, further comprising an insulating substrate, wherein the first heat generating element is disposed on the insulating substrate or disposed in the insulating substrate.

5. The protection device as claimed in claim 1, wherein the terminal electrodes further comprise a third terminal electrode, and the third terminal electrode is electrically connected to another end of the first heat generating element.

6. The protection device as claimed in claim 1, wherein the two ends of the fusible conductor have a bevel portion there between, or the two ends of the fusible conductor have a protruding portion there between.

7. The protection device as claimed in claim 1, wherein the first heat generating element is disposed on or coupled to a central portion of the fusible conductor.

8. The protection device as claimed in claim 2, further comprising an adsorption electrode, wherein one end of the adsorption electrode is coupled to the fusible conductor, and another end of the adsorption electrode is coupled to one end of the first heat generating element or the insulation casing.

9. The protection device as claimed in claim 1, further comprising a second fusible conductor and a third terminal electrode, wherein the second fusible conductor and the first heat generating element are electrically connected in series between the two-way current path and the third terminal electrode.

10. The protection device as claimed in claim 1, wherein the insulation casing comprises at least one opening or a porous ceramic structure.

11. The protection device as claimed in claim 1, wherein an orthogonal projection of the first heat generating element on the fusible conductor and an orthogonal projection of the first terminal electrode or the second terminal electrode on the fusible conductor are at least partially overlapped.

12. The protection device as claimed in claim 9, further comprising a second adsorption electrode, wherein one end of the second adsorption electrode is coupled to the second fusible conductor, and another end of the of the second adsorption electrode is coupled to the first heat generating element.

13. The protection device as claimed in claim 2, wherein the insulation casing comprises an indent portion.

14. The protection device as claimed in claim 1, wherein at least one of the first terminal electrode and the second terminal electrode has a bevel.

15. A protection device, comprising:
   a plurality of terminal electrodes, comprising a first terminal electrode and a second terminal electrode;
   a fusible conductor, wherein two ends of the fusible conductor are electrically connected to the first terminal electrode and the second terminal electrode, respectively; and
   a first heat generating element, comprising two heater electrodes and a first heater, wherein the two heater electrodes and the first heater construct a sandwich structure, and one end of the first heat generating element is coupled to the fusible conductor.

16. The protection device as claimed in claim 15, wherein the first heat generating element is disposed on or coupled to a central portion of the fusible conductor.

17. The protection device as claimed in claim 15, wherein the terminal electrodes further comprise a third terminal electrode, and the third terminal electrode is electrically connected to another end of the first heat generating element.

18. The protection device as claimed in claim 16, further comprising an adsorption electrode, wherein one end of the adsorption electrode is coupled to the fusible conductor, and another end of the adsorption electrode is coupled to one end of the first heat generating element.

19. A battery pack, comprising:
- at least one battery element;
- a protection device, comprising:
  - a plurality of terminal electrodes, comprising a first terminal electrode and a second terminal electrode;
  - a fusible conductor, wherein a lower surface of the fusible conductor is respectively disposed on the first terminal electrode and the second terminal electrode, and the fusible conductor is supported by the first terminal electrode and the second terminal electrode, and two ends of the fusible conductor are electrically connected to the first terminal electrode and the second terminal electrode, respectively, so as to form a two-way current path between the first terminal electrode and the second terminal electrode; and
  - a first heat generating element, wherein one end of the first heat generating element is coupled to another surface of the fusible conductor different to the lower surface of the fusible conductor, or one end of the first heat generating element is coupled to a surface of any one of the first terminal electrode and the second terminal electrode,
  - wherein the protection device is connected in series with the at least one battery element to form at least one charge or discharge current path, and has an ability to disconnect the charge or discharge current path;
- a switching circuit, configured to control a current passing through the first heat generating element; and
- a detection control circuit, configured to detect a voltage or a temperature of the at least one battery element, and determine a state of the switching circuit according to the detected voltage or temperature.

20. A battery pack, comprising:
- at least one battery element;
- a protection device, comprising:
  - a plurality of terminal electrodes, comprising a first terminal electrode and a second terminal electrode;
  - a fusible conductor, wherein two ends of the fusible conductor are electrically connected to the first terminal electrode and the second terminal electrode, respectively; and
  - a first heat generating element, comprising two heater electrodes and a first heater, wherein the two heater electrodes and the first heater construct a sandwich structure, and one end of the first heat generating element is coupled to the fusible conductor,
  - wherein the protection device is connected in series with the at least one battery element to form at least one charge or discharge current path, and has an ability to disconnect the charge or discharge current path;
- a switching circuit, configured to control a current passing through the first heat generating element; and
- a detection control circuit, configured to detect a voltage or a temperature of the at least one battery element, and determine a state of the switching circuit according to the detected voltage or temperature.

* * * * *